US011633925B2

(12) United States Patent
Sinha et al.

(10) Patent No.: US 11,633,925 B2
(45) Date of Patent: *Apr. 25, 2023

(54) SYSTEM AND METHOD FOR IMPROVING THERMOSET-THERMOPLASTIC INTERFACE ADHESION

(71) Applicant: The Boeing Company, Chicago, IL (US)

(72) Inventors: Nishant Kumar Sinha, Bangalore (IN); Om Prakash, Bangalore (IN)

(73) Assignee: The Boeing Company, Arlington, VA (US)

( * ) Notice: Subject to any disclaimer, the term of this patent is extended or adjusted under 35 U.S.C. 154(b) by 261 days.

This patent is subject to a terminal disclaimer.

(21) Appl. No.: 16/537,471

(22) Filed: Aug. 9, 2019

(65) Prior Publication Data
US 2021/0039330 A1  Feb. 11, 2021

(51) Int. Cl.
  *B29C 65/00* (2006.01)
  *B29K 63/00* (2006.01)
  *B29K 101/12* (2006.01)

(52) U.S. Cl.
  CPC ........ *B29C 66/028* (2013.01); *B29C 66/0342* (2013.01); *B29C 66/41* (2013.01);
  (Continued)

(58) Field of Classification Search
  CPC ... B29C 66/028; B29C 66/0342; B29C 66/41; B29C 66/712; B29C 66/72323;
  (Continued)

(56) References Cited

U.S. PATENT DOCUMENTS

| 2002/0014306 A1* | 2/2002 | Virtanen | B32B 37/00 156/310 |
| 2016/0121327 A1* | 5/2016 | Shim | B29C 66/114 422/503 |

(Continued)

FOREIGN PATENT DOCUMENTS

| DE | 102017200471 A1 | 7/2018 |
| EP | 1563906 A1 | 8/2005 |

(Continued)

OTHER PUBLICATIONS

Moorleghem, "Welding of thermoplastic to thermoset composites through a thermoplastic interlayer," MSc. Thesis Aerospace Engineering at the Delft University of Technology, dated Jun. 2, 2016, 67 pages.

(Continued)

*Primary Examiner* — S. Behrooz Ghorishi
(74) *Attorney, Agent, or Firm* — Yee & Associates, P.C.

(57) ABSTRACT

Illustrative examples of forming and using suitably adapted materials for improving interface strength between thermoset-thermoplastic joined parts includes exposure of a thermoplastic substrate to a plasma to form an amine-functionalized substrate having amine chemical moieties disposed on a first surface. The first surface of the thermoplastic substrate is positioned adjacent to and contacts a second surface of a thermoset substrate to form a workpiece. The thermoset substrate includes epoxide chemical moieties on and within material forming the thermoset substrate. The workpiece is subsequently heated to form a structure, where heating of the workpiece causes covalent chemical bonds to form between the plasma-treated first surface of the thermoplastic substrate and the second surface of the thermoset substrate. Thereafter, additional thermoplastic components can be fusion bonded to a surface of the thermoplastic substrate opposite (Continued)

the first surface—thereby providing improved attachment of additional thermoplastic components to the thermoset substrate.

21 Claims, 6 Drawing Sheets

(52) U.S. Cl.
CPC ...... *B29C 66/712* (2013.01); *B29C 66/72323* (2013.01); *B29K 2063/00* (2013.01); *B29K 2101/12* (2013.01)

(58) Field of Classification Search
CPC . B29C 65/10; B29C 65/4835; B29C 66/7394; B29C 66/723; B29C 66/7315; B29C 65/02; B29C 66/45; B29C 66/7212; B29C 66/7392; B29C 66/1122; B29K 2063/00; B29K 2101/12; B29L 2031/30; B29L 2031/3076
See application file for complete search history.

(56) References Cited

U.S. PATENT DOCUMENTS

| | | |
|---|---|---|
| 2019/0152200 A1 | 5/2019 | Collette et al. |
| 2021/0039369 A1 | 2/2021 | Sinha et al. |

FOREIGN PATENT DOCUMENTS

| | | |
|---|---|---|
| JP | 2015150885 A | 8/2015 |
| WO | 2013123023 A2 | 8/2013 |

OTHER PUBLICATIONS

Mohan et al.,"Effect of an Atmospheric Pressure Plasma Treatment on the Mode I Fracture Toughness of a Co-cured Composite Joint," The Journal of Adhesion, 2014, pp. 733-754, vol. 90, Issue 9.

Dalongeville et al., "Mechanical properties of polymer foams: influence of the internal architecture on the stiffness," 23rd French Congress of Mechanics, Institut Charles Sadron, 2017, 9 pages.

Office Action, dated Feb. 22, 2021, regarding U.S. Appl. No. 16/537,484, 22 pages.

Farhang, "Void Evolution During Processing of Out-of-Autoclave Prepreg Laminates," Oct. 2014, Thesis at University of British Columbia, pp. ii-195.

Extended European Search Report, dated Dec. 11, 2020, regarding Application No. 20190018.0, 8 pages.

Extended European Search Report, dated Dec. 14, 2020, regarding Application No. 20190024.8, 18 pages.

Shaw et al., Surface Treatment and Bonding of Thermoplastic Composites, Sep. 3, 1996, AGARD advisory group for Aerospace research and development, pp. 12-1 to 12-11 (Year 1996).

Final Office Action, dated Jun. 16, 2021, regarding USPTO Application No. 16/537,484, 24 pages.

Office Action, dated Dec. 2, 2021, regarding USPTO Application No. 16/537,484, 21 pages.

Extended European Search Report, dated Oct. 13, 2022, regarding Application No. 22186975.3, 7 pages.

\* cited by examiner

SYSTEM AND METHOD FOR IMPROVING THERMOSET-THERMOPLASTIC INTERFACE ADHESION

BACKGROUND INFORMATION

Field

The present disclosure generally relates to joining or otherwise attaching thermoplastic components to thermoset components, and more particularly, to compositions, preparations, and uses of plasma-treated thermoplastic sheets that are co-cured with epoxy thermoset material to subsequently provide a strong mechanical welding of a thermoplastic part to a thermoplastic material surface of a co-cured thermoset-thermoplastic composite structure.

Background

Conventional techniques of joining cured thermoset composite materials for aerospace applications do not provide for strong attachment of thermoplastic layers. Generally, such structures are joined by mechanical fastening—optionally, in conjunction with use of an adhesive. Such attachment is considered sub-optimal because fasteners generally require disposition of holes in thin fibrous material layers of the structure. These holes produce local stress concentrations, with the number of plies and attendant weight of the resulting structure being increased to accommodate the stress concentrations. Adhesive-only joints generally do not require holes, but such joints still have challenges in non-destructive testing (NDT), which can preclude their use for joining structural parts in aerospace applications.

Consolidated thermoplastic materials can be joined with fusion bonding—a technique that melts or softens thermoplastic material under elevated temperature. Molecular chains of thermoplastic resin exhibit increased motility in a molten or softened state. If molten thermoplastic is placed in contact with another miscible polymer, their respective molecular chains can diffuse into each other and intermingle, thereby creating a mechanical bond upon cooling. This mechanical bond generally does not have localized stress concentrations typically associated with fasteners, but also does not provide for strong attachment. For example, such mechanical bonds are typically the weakest joints in a thermoset/thermoplastic fusion bonded assembly.

Therefore, it would be desirable to have a composition, method, apparatus, and system that take into account at least some of the issues discussed above, as well as other possible issues. For example, it would be desirable to have a composition, method, apparatus, and system that overcome technical problems associated with providing strong or otherwise improved attachment between thermoplastic parts and thermoset composites.

SUMMARY

One illustrative example of the present disclosure provides a method of joining components. The method includes exposing a first substrate to a plasma such that an amine-functionalized substrate is formed. The amine-functionalized substrate includes amine chemical moieties disposed on a first surface of the first substrate. The method also includes positioning the first surface of the first substrate adjacent to a second surface of a second substrate to form a workpiece. The first surface contacts the second surface. The method further includes heating the workpiece to form a heated workpiece, and cooling the heated workpiece to form a structure.

Another illustrative example of the present disclosure provides a method for improving interface strength between joined parts. The method includes positioning a first surface of an amine-functionalized substrate adjacent to a second surface of a second substrate to form a workpiece. The amine-functionalized substrate is provided as a first substrate treated with a plasma. The method further includes heating the workpiece to form a heated workpiece, and cooling the heated workpiece to form a structure.

Yet another illustrative example of the present disclosure provides a structure that includes a first substrate interposed between a second substrate and a third substrate. The first substrate has a first side and a second side, the second side opposing the first side. The second substrate has a third side, where the third side of the second substrate is covalently bonded through a plurality of nitrogen atoms to the first side of the first substrate. The third substrate has a fourth side, where the fourth side of the third substrate is connected to the second side of the first substrate.

Features and functions can be achieved independently in various examples of the present disclosure, or may be combined in yet other examples, in which further details can be seen with reference to the following description and drawings.

BRIEF DESCRIPTION OF THE DRAWINGS

Representative features of illustrative examples are set forth in the appended claims. Illustrative examples, however, as well as representatively described modes of use, further objectives, and features thereof, will best be understood by reference to the following detailed description of illustrative examples of the present disclosure when read in conjunction with accompanying drawings, wherein:

DETAILED DESCRIPTION

Figure 1:
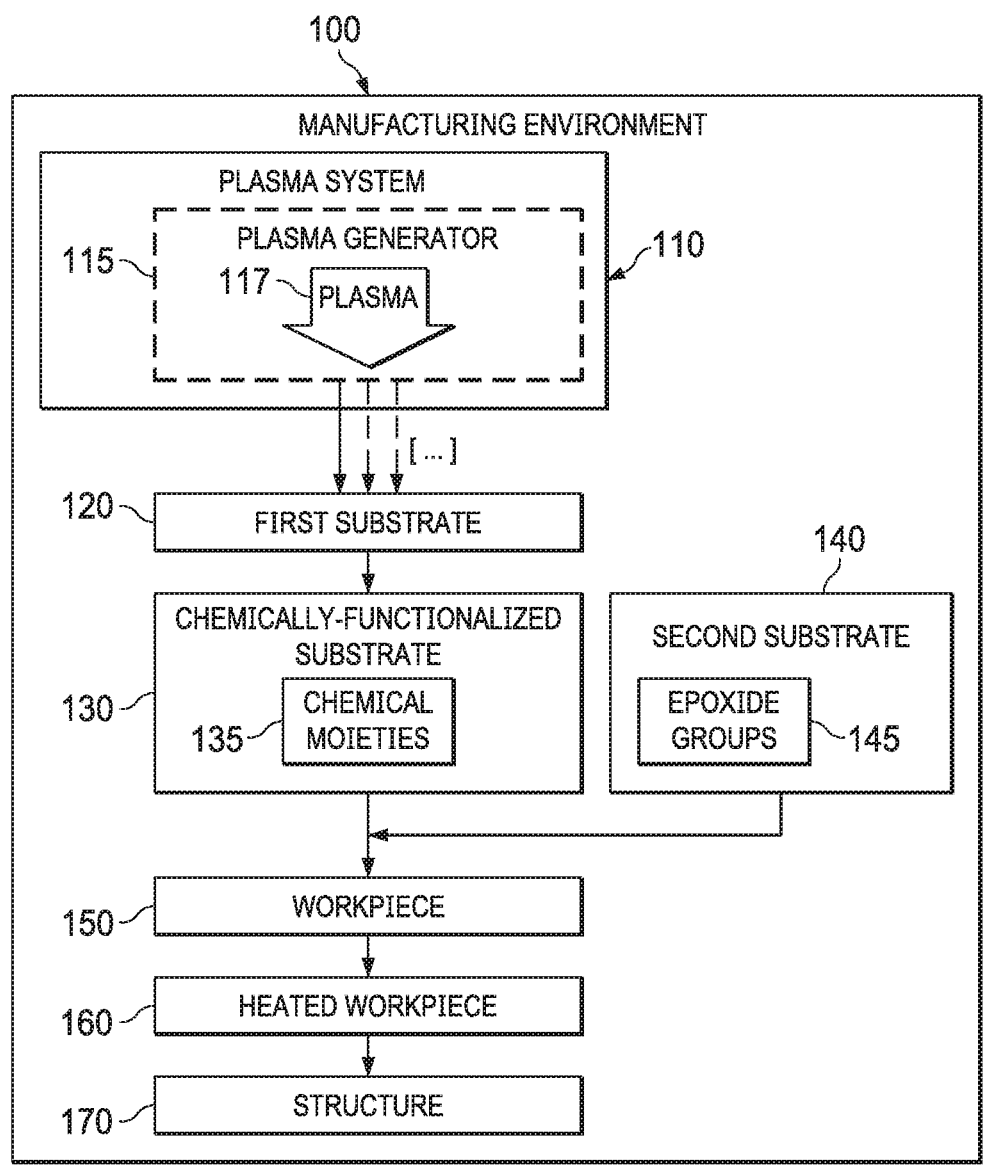
FIG. 1 is an illustration of a block diagram of a manufacturing environment in accordance with an illustrative example.

Illustrative examples herein recognize and take into account one or more different considerations. For example, illustrative examples generally recognize three available methods for joining thermoplastic parts to thermoset parts: mechanical fastening, adhesive bonding, and welding (also termed fusion bonding). Illustrative examples also recognize that due to inherent problems of stress concentrations associated with mechanical fastening, and difficulty encountered in non-destructive testing (NDT) of adhesive-only joints, welding is typically selected as an option for joining polymeric parts to each other. Still other illustrative examples recognize and take account that, unlike thermoplastics, thermoset laminate components generally cannot be welded.

Joining of cured thermoset composite and consolidated thermoplastic composite is an increasing area of interest that will allow the aerospace industry to utilize thermoplastic composites (TPC) for structural applications. By way of example, it may be of interest to join a polyether ether ketone (PEEK)-carbon fiber (CF) bracket to an epoxy-CF skin. In accordance with various illustrative examples, a method of co-curing a thermoplastic sheet on a thermoset laminate is disclose, where co-curing forms an interlayer between, for example, a thermoplastic sheet and thermoset material layer. The co-cured thermoplastic sheet can then be welded to a TPC. As the thermoplastic sheet and the TPC are welded with heating and consolidation, an interpenetrated network (IPN) of polymer chains forms at the interface between the thermoplastic sheet and the TPC.

In illustrative examples described herein, a first thermoplastic substrate is plasma treated to include, for example, amine ($-NH_2$) functionality. The resulting amine-functionalized substrate is then positioned adjacent an epoxy-containing substrate, such that an amine-functionalized surface of the first thermoplastic substrate contacts a surface of the epoxy-containing substrate to form a workpiece. The workpiece is then heated, such that cross-linking reactions form covalent bonds between the first thermoplastic substrate and the epoxy-containing substrate. An opposing side of the first thermoplastic substrate opposite the amine-functionalized surface may then be welded to a second thermoplastic substrate. The covalent bonds between the first thermoplastic substrate and the epoxy-containing substrate provide strong chemical bonds and overall stronger parts as compared to, for example, adhesive-only attachment techniques.

In some illustrative examples, a first thermoplastic sheet is plasma treated to include, for example, amine ($-NH_2$) functionality. The resulting amine-functionalized sheet is then positioned over an epoxy laminate, such that an amine-functionalized surface of the first thermoplastic sheet contacts a surface of the epoxy laminate to form a workpiece. The workpiece is then heated, such that cross-linking reactions form covalent bonds between the first thermoplastic sheet and the epoxy laminate. An opposing side of the first thermoplastic sheet opposite the covalently bonded surface may then be fusion bonded to a second thermoplastic sheet. The covalent bonds between the first thermoplastic sheet and the epoxy laminate provide strong chemical bonds and overall stronger parts as compared to, for example, adhesive-only attachment techniques.

In some implementations, a first surface of a first polymer sheet is treated with an ammonia ($NH_3$) plasma or nitrogen plasma—or a nitrogen and hydrogen plasma—to selectively introduce amine chemical functionality on the first surface. A second surface of an epoxy laminate is brought into contact with and on the first surface of the first polymer sheet, and thereafter subjected to a heat source to initiate chemical cross-linking.

Chemical cross-linking involves chemical dehydration reactions occurring between amine chemical moieties of the plasma-treated first sheet and epoxide chemical moieties of the epoxy laminate. Covalent bonds are formed by dehydration reactions—for example, chemical bonds through nitrogen atoms formerly associated with the amine chemical moieties prior to thermal treatment. The covalent bonds are between the first surface of the first polymer sheet and the second surface of the epoxy laminate. Water is produced as a byproduct of the chemical reaction. The covalent bonds formed by chemical cross-linking between the first polymer sheet and the epoxy laminate generally provide stronger adherence therebetween than as between components that are joined together using adhesives or fasteners alone—thereby leading to improved part strength with chemical cross-linking. Furthermore, the chemically cross-linked first polymer sheet provides a fusion bonding surface opposing the first surface that can be used for subsequent welding of one or more additional polymer sheets—thereby providing a system and method for conditioning or otherwise preparing an epoxy laminate or other epoxy-containing material for attachment to thermoplastic sheets or other thermoplastic material with welding.

Unless expressly stated to the contrary, "or" refers to an inclusive or and not an exclusive or. That is, the term "or" as used herein is generally intended to mean "and/or" unless otherwise indicated. For example, a condition "A or B" is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless the context clearly indicates otherwise. Also, as used in the description herein, the meaning of "on" includes "in" and "on," unless the context clearly indicates otherwise.

In other illustrative examples, a first thermoplastic sheet is treated with an ammonia or nitrogen plasma—or a nitrogen ($N_2$) and hydrogen ($H_2$) plasma—to selectively introduce amine chemical functionality on a surface of the first thermoplastic sheet. The plasma-treated first surface is located to and contacts an epoxy-containing material second surface—for example, a substrate that includes epoxide chemical functionality on or in a surface of the second surface. Location of the plasma-treated first surface can be, for example, above, over, or on the epoxy-containing second surface. The formation of a first feature "over" or "on" a second feature may include examples in which the first and second features are formed in direct contact, and may also include examples in which additional features may be formed between the first and second features, such that the first and second features may not be in direct contact. Spatially relative terms, such as "up," "down," "under,"

"beneath," "below," "lower," "upper," "above," "over," "higher," "adjacent," "interadjacent," "interposed," "between," or the like, may be used herein for ease of description to representatively describe one or more elements or features in relation to other elements or features as representatively illustrated in the figures. Spatially relative terms are intended to encompass different orientations of devices or objects in use or operation, in addition to orientations illustrated in the figures. An apparatus, device, or object may be otherwise spatially transformed—for example, rotated by 90 degrees—and the spatially relative descriptors used herein may likewise be interpreted accordingly.

The combined assembly of the plasma-treated first thermoplastic sheet and the epoxy-containing materials is subjected to a heat source to initiate chemical cross-linking. Chemical cross-linking between the plasma-treated first thermoplastic sheet and the epoxy-containing material involves dehydration reactions occurring between amine chemical moieties of the thermoplastic sheet and epoxide chemical moieties of the epoxy-containing material. The dehydration reactions form covalent bonds—for example, through nitrogen atoms formerly associated with the amine chemical moieties prior to chemical cross-linking. The covalent bonds are between the plasma-treated first surface and the second surface of the epoxy-containing material. Water ($H_2O$) is produced as a byproduct of the dehydration reaction. Covalent bonds formed by chemical cross-linking between the plasma-treated first thermoplastic sheet and the epoxy-containing material generally provides stronger attachment between cross-linked surfaces that leads to improved overall part strength. Cross-linking between first and second surfaces takes place at the interface between the first thermoplastic sheet and the epoxy-containing material, and operates to join the first thermoplastic sheet and the epoxy-containing material together with covalent chemical bonds.

As used herein, the term "thermoset" generally refers to a polymer-based liquid or powder that becomes solid when heated, placed under pressure, treated with a chemical, or exposed to radiation. The curing process of a thermoset material, such as, for example, epoxy-containing materials, creates a chemical bond that, unlike a thermoplastic, prevents the thermoset material from being re-melted.

As used herein, the term "thermoplastic" generally refers to a polymer material that becomes pliable with heat—and, with sufficient temperature, becomes a liquid. When cooled, heated thermoplastics revert to a solid state.

A thermoset/thermoplastic interphase is generally considered to be weaker than a thermoplastic/thermoplastic IPN welded joint. Additionally, not all combinations of thermoplastic materials and thermoset materials exhibit compatible cohesive energy to form an interphase. For example, PEEK and epoxy generally do not form a suitable interphase.

Covalent bonds formed between chemically-functionalized thermoplastic material and thermoset material, in accordance with illustrative examples described herein, contribute to improved strength of subsequently joined thermoplastic parts. That is to say, chemical functionalization of thermoplastic material, in accordance with illustrative aspects, to chemically bond with thermoset material can be employed to suitably condition the thermoset material for subsequent welding to other thermoplastic parts—for example, with IPN fusion bonding of a thermoplastic part to an opposing surface of the chemically-functionalized thermoplastic material covalently bonded to the thermoset material.

In illustrative examples, one or more technical solutions are presented that overcome technical problems associated with providing strong attachment between thermoset (TS) component parts and thermoplastic (TP) component parts. As a result, one or more technical solutions described herein provide technical effects of enabling formation of chemical bonds between constituent materials used in TS/TP composite manufacturing processes, enabling fabrication of TS/TP composite manufactured parts that are at least as strong as parts fabricated with other techniques, enabling increased utilization of TS/TP composite manufacturing for making strong parts, supporting part qualification with respect to manufacturing specifications or mechanical property requirements, or realizing cost savings associated with using TS/TP composite manufacturing to make parts that are at least as strong as parts fabricated with other processes.

The flowcharts and block diagrams in the different depicted examples illustrate architecture, functionality, and operation of some possible implementations of apparatuses and methods in illustrative examples. In this regard, each block in flowcharts or block diagrams can represent at least one of a module, a segment, a function, or a portion of an operation or step. The figure illustrations are not meant to imply physical or architectural limitations to the manner in which illustrative examples may be implemented. Other components in addition to or in place of ones illustrated may be used. Some components may be unnecessary. Additionally, blocks are presented to illustrate some functional components. One or more blocks may be combined, divided, or combined and divided into different blocks when implemented in an illustrative example.

With reference now to the figures, and in particular with reference to FIG. 1, an illustration of a block diagram of a manufacturing environment is depicted in accordance with an illustrative example. As representatively depicted, manufacturing environment 100 includes plasma system 110. In this illustrative example, plasma system 110 is a physical system and can include any type or any number of component devices. In this illustrative example, plasma system 110 can include at least one of a wand plasma device, an atmospheric plasma device, a plasma chamber, other suitable type of component device, or combinations thereof.

As used herein, the phrase "at least one of," when used with a list of items, means different combinations of one or more of the listed items can be used, and only one of each item in the list may be needed. In other words, "at least one of" means any combination of items or number of items can be used from the list, but not all of the items in the list are required. The item can be a particular object, a thing, or a category. For example, without limitation, "at least one of item A, item B, or item C" may include item A, item A and item B, or item B. This example also may include item A and item B and item C, or item B and item C. Of course, any permutative combination of these items can be present. In some illustrative examples, "at least one of item A, item B, or item C" can be, for example, without limitation: two of item A, one of item B, and ten of item C; four of item B and seven of item C; or other suitable combinations.

As used herein, the terms "comprises," "comprising," "includes," "including," "has," "having," or any contextual variant thereof, are intended to cover a non-exclusive inclusion. For example, a process, product, composition, article, or apparatus that comprises a list of elements is not necessarily limited to only those elements, but may include other elements not expressly listed or inherent to such process, product, composition, article, or apparatus.

Plasma system 110 includes plasma generator 115. Plasma generator 115 is configured to generate plasma 117. First substrate 120 is exposed to plasma 117 to produce amine-functionalized substrate 130, such that amine-functionalized substrate 130 includes amine chemical functional groups on a surface of first substrate 120. For example, plasma generator 115 can be suitably configured to produce an ammonia-containing plasma as plasma 117. In illustrative examples, plasma 117 can include ammonia ($NH_3$), or plasma 117 can conjunctively or alternatively include molecular nitrogen ($N_2$), molecular hydrogen ($H_2$), or molecular nitrogen and molecular hydrogen.

In another illustrative example, plasma generator 115 can be used for multiple depositions of, or exposures to, plural plasmas. For example, after exposing first substrate 120 to a first plasma (e.g., ammonia, molecular nitrogen, molecular hydrogen, or the like), first substrate 120 may be subsequently exposed to a different plasma (e.g., molecular oxygen, carbon dioxide, or the like). Plural exposures of a substrate to different plasmas will be discussed later herein.

As used herein, the term "substrate" generally refers to an object which provides a surface on which something is deposited. As used herein, the term "sheet" generally means being in the form of a broad, flat piece of material. In some illustrative examples, sheets can range in thickness from 100μ to 1000μ. Additionally, any number of substrates or sheets can comprise a same material, and can be provided in any number of thicknesses, shapes, or aspect ratios.

First substrate 120 includes a polymer material suitably configured for use in a sheet-based composite manufacturing process. For example, first substrate 120 can include, nylon, flame-retardant nylon, mineral/glass-filled nylon, polystyrene, polyethylene, polymethylmethacrylate (PMMA), thermoplastic elastomers, polyarylether ketones (PAEK), other polymer material, or the like. In representative implementations, selection of a suitable polymer material can be based on, for example, a desired melting temperature, characteristic of a three-dimensional part so formed, or characteristic relating to stability under conditions for achieving an activation energy associated with forming covalent chemical bonds between substrates.

Exposure of first substrate 120 to plasma 117 produces amine-functionalized substrate 130. Amine-functionalized substrate 130 includes amine chemical moieties 135 on plasma-exposed surfaces of amine-functionalized substrate 130. As depicted, amine chemical moieties 135 can be a number of —$NH_2$ chemical functional groups.

Second substrate 140 includes epoxide chemical functional groups on surfaces of and in material forming second substrate 140. Second substrate 140 includes a polymer material suitably configured for use in an composite manufacturing process. For example, second substrate 140 can include any of resins, adhesives, plastics, or other materials that are polymers of epoxides, or the like. In representative implementations, selection of a suitable epoxy-containing polymer material can be based on, for example, one or more characteristics of a structure or part so formed, or one or more characteristics relating to stability under conditions for achieving an activation energy associated with forming covalent chemical bonds between TS/TP substrates.

In illustrative examples, first substrate 120 can comprise a thermoplastic material. As discussed above, a thermoplastic, or thermo-softening plastic, is a polymer material that becomes pliable or moldable at elevated temperature and solidifies upon cooling. In a heated state, thermoplastics can be reshaped, and can be used to produce parts by various polymer processing techniques, such as injection molding, compression molding, calendering, and extrusion. Physical properties of thermoplastics can change drastically without an associated phase change above glass transition temperatures and below melting points. Some thermoplastics do not fully crystallize below their glass transition temperature—retaining some or all of their amorphous characteristics. Amorphous and semi-amorphous thermoplastics can be used when high optical clarity is desired.

Second substrate 140 includes epoxide chemical moieties 145 on exposed surfaces of and within material forming second substrate 136. In illustrative examples, epoxide chemical moieties 145 includes bridging —O— chemical functional groups.

Amine-functionalized substrate 130 and second substrate 140 are combined, forming workpiece 150. For example, amine-functionalized substrate 130 can be located to second substrate 140, such than amine chemical moieties 135 are disposed on or near epoxide chemical moieties 145.

Workpiece 150 is subjected to heat, forming heated workpiece 160. In illustrative examples, one or more heat sources can include an autoclave or oven—for example, as used in a composite manufacturing system. It will be appreciated, however, that other types of heat sources can be alternatively, conjunctively, or sequentially used. For example, a thermal fusion bonding process can be used. Thermal fusion bonding is a process which fuses more than one material or substrate via a thermal cycle. The temperature for performing thermal fusion is typically somewhat higher than a glass transient temperature for the materials being fused.

As described in greater detail later herein with reference to FIGS. 3, 4, and 7, heating of workpiece 150 initiates chemical reactions between amine chemical moieties 135 and epoxide chemical moieties 145 to produce covalent chemical bonds between amine-functionalized substrate 130 and second substrate 140. Formation of covalent chemical bonds provides improved part strength with representative implementations of materials and composite manufacturing processes according to illustrative examples.

Heated workpiece 160 is thereafter cooled, forming structure 170. In an illustrative example, structure 170 may not be a fully-formed part. For example, in some illustrative examples, structure 170 can be a component layer or a subset of component layers of a composite manufactured three-dimensional part. Structure 170 can be, for example, an aircraft part, an interior monument, a wall, an air duct, a fairing, a wire shroud, a power distribution panel, a stowage case, a gear box cover, a lattice structure, a skin panel, a bracket, a handle, or the like.

Figure 2:
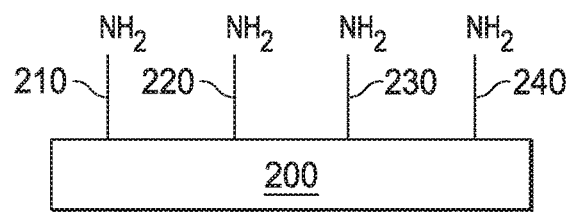
FIG. 2 is an illustration of a plasma-treated first substrate in accordance with an illustrative example.

Turning now to FIG. 2, an illustration of a plasma-treated first substrate is depicted in accordance with an illustrative example. As representatively depicted, amine-functionalized sheet 200 includes amine chemical moieties, such as amine chemical moiety 210, amine chemical moiety 220, amine chemical moiety 230, and amine chemical moiety 240—for example, as described above with reference to illustrative examples according to amine chemical moieties 135 as representatively depicted in FIG. 1. In illustrative examples, amine-functionalized sheet 200 can be a plasma-treated first thermoplastic sheet—for example, a thermoplastic sheet provided as first substrate 120 that is exposed to plasma 117 to produce amine chemical moieties 135, as representatively illustrated in FIG. 1.

Figure 3:
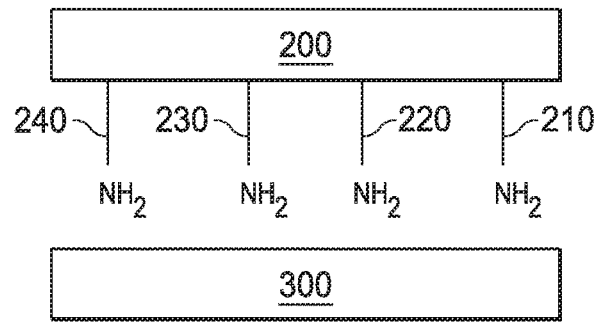
FIG. 3 is an illustration of a second substrate positioned adjacent to a plasma-treated first substrate in accordance with an illustrative example.

Turning now to FIG. 3, an illustration of a second substrate positioned adjacent to a plasma-treated first substrate is depicted in accordance with an illustrative example. As representatively depicted, amine chemical moiety 210, amine chemical moiety 220, amine chemical moiety 230, and amine chemical moiety 240 of amine-functionalized sheet 200 are disposed adjacent to or otherwise near epoxy-containing substrate 300. In illustrative examples, epoxy-containing substrate 300 can be provided as second substrate 140 including epoxide chemical moieties 145, as representatively illustrated in FIG. 1.

Figure 4:
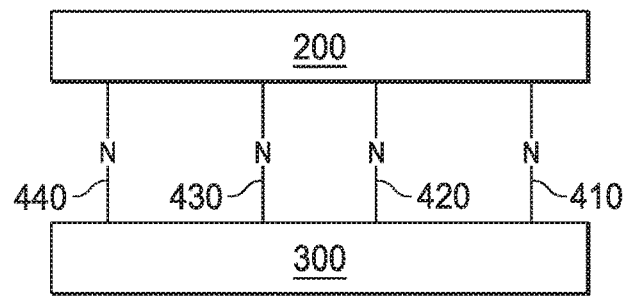
FIG. 4 is an illustration of a plasma-treated first substrate covalently bonded to a second substrate in accordance with an illustrative example.

Turning now to FIG. 4, an illustration of a plasma-treated first substrate covalently bonded to a second substrate is depicted in accordance with an illustrative example. As representatively depicted, amine-functionalized sheet 200 and epoxy-containing substrate 300 are adhered to one another with covalent bonds through nitrogen atoms 410, 420, 430, and 440. It will be appreciated that a much greater area or surface density of amine-functionalized substrate and epoxide-containing substrate can be similarly covalently bonded with each other—for example, laterally extending along amine-functionalized sheet 200 and epoxy-containing substrate 300. In illustrative examples, a combination of amine-functionalized sheet 200 and epoxy-containing substrate 300 prior to heating and formation of covalent bonds through nitrogen atoms 410, 420, 430, and 440 corresponds to workpiece 150, as representatively illustrated in FIG. 1. In other illustrative examples, a combination of amine-functionalized sheet 200 and epoxy-containing substrate 300 during heating and formation of covalent bonds through nitrogen atoms 410, 420, 430, and 440 corresponds to heated workpiece 160, as representatively illustrated in FIG. 1. In still other illustrative examples, a combination of amine-functionalized sheet 200 and epoxy-containing substrate 300 after heating and formation of covalent bonds through nitrogen atoms 410, 420, 430, and 440 corresponds to structure 170, as representatively illustrated in FIG. 1.

Figure 5:
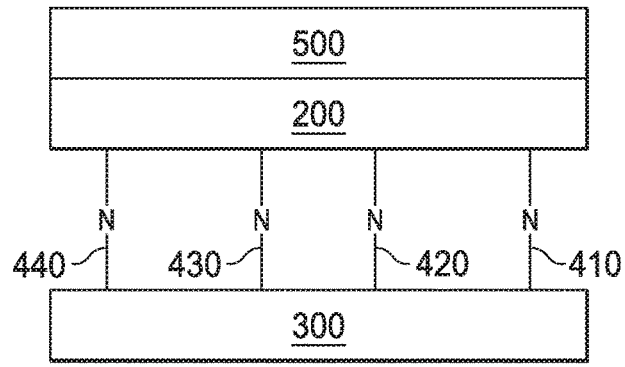
FIG. 5 is an illustration of a third substrate welded to a plasma-treated first substrate that is covalently bonded to a second substrate in accordance with an illustrative example.

Turning now to FIG. 5, an illustration of a third substrate welded to a plasma-treated first substrate that is covalently bonded to a second substrate is depicted in accordance with an illustrative example. As representatively depicted, a surface of amine-functionalized sheet 200 opposing covalent bonds through nitrogen atoms 410, 420, 430, and 440 is fusion bonded to second sheet 500. In illustrative examples, second sheet 500 can be a second thermoplastic sheet—for example, a thermoplastic sheet provided for welding to a surface of first substrate 120 after formation of structure 170. In a representative aspect, covalent bonds through nitrogen atoms 410, 420, 430, and 440 are interposed between amine-functionalized sheet 200 and epoxy-containing substrate 300. In another representative aspect, covalent bonds through nitrogen atoms 410, 420, 430, and 440 are interposed between epoxy-containing substrate 300 and second sheet 500. In yet another representative aspect, amine-functionalized sheet 200 is interposed between covalent bonds through nitrogen atoms 410, 420, 430, and 400 and second sheet 500. In still another representative aspect, amine-functionalized sheet 200 is interposed between epoxy-containing substrate 300 and second sheet 500.

Figure 6:
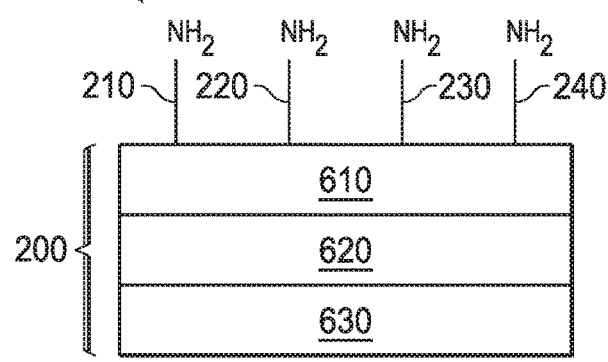
FIG. 6 is an illustration of a plasma-treated, multi-layer first substrate in accordance with an illustrative example.

Turning now to FIG. 6, an illustration of a plasma-treated, multi-layer first substrate is depicted in accordance with an illustrative example. As representatively depicted, multi-layer substrate 600 comprises amine-functionalized sheet 200, which includes first substrate layer 610, second substrate layer 620, and third substrate layer 630. First substrate layer 610 of multi-layer substrate 600 includes amine chemical moieties, such as amine chemical moiety 210, amine chemical moiety 220, amine chemical moiety 230, and amine chemical moiety 240—for example, as described above with reference to illustrative examples according to amine chemical moieties 135 as representatively depicted in FIG. 1. In illustrative examples, multi-layer substrate 600 can be a plasma-treated first thermoplastic sheet—for example, a multi-layer thermoplastic sheet provided as first substrate 120 that is exposed to plasma 117, as representatively illustrated in FIG. 1.

Figure 7:
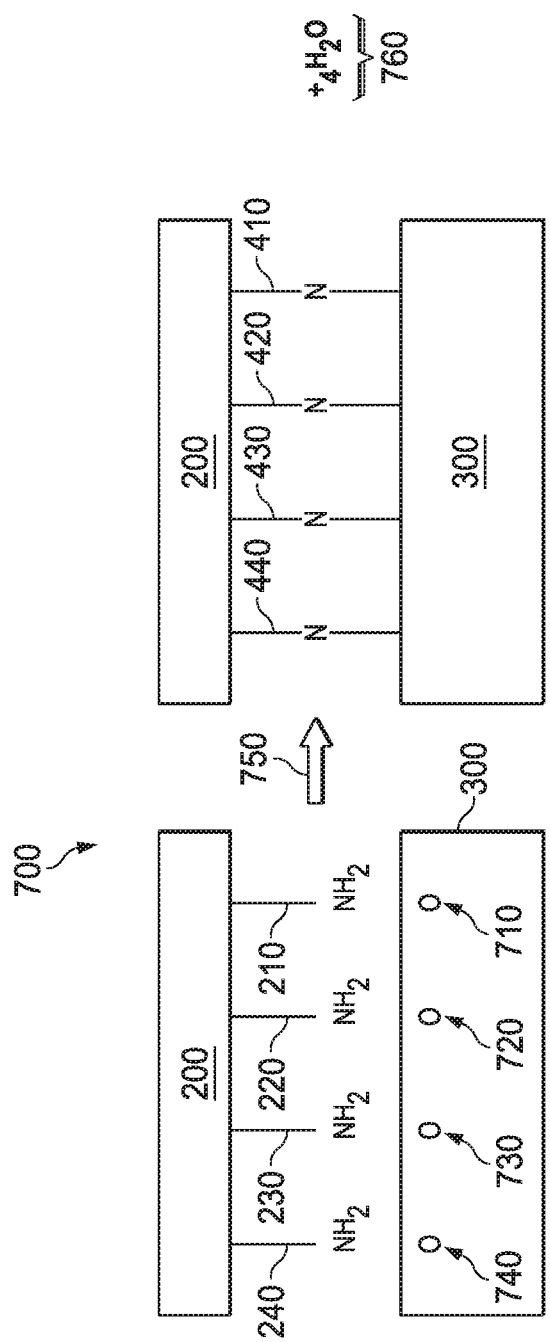
FIG. 7 is an illustration of a dehydration reaction between amine chemical moieties of a plasma-treated first substrate and epoxide chemical moieties of a second substrate in accordance with an illustrative example.

Turning now to FIG. 7, an illustration of a dehydration reaction 700 between amine chemical moieties of a plasma-treated first substrate and epoxide chemical moieties of a second substrate is depicted in accordance with an illustrative example. As representatively depicted, heating 750 of amine-functionalized sheet 200 and epoxy-containing substrate 300 achieves an activation energy associated with initiating chemical reactions between amine chemical moiety 210 and epoxide chemical moiety 710, between amine chemical moiety 220 and epoxide chemical moiety 720, between amine chemical moiety 230 and epoxide chemical moiety 730, and between amine chemical moiety 240 and epoxide chemical moiety 740. A covalent bond through nitrogen atom 410 is formed as a result of chemical reaction between amine chemical moiety 210 and epoxide chemical moiety 710—along with one molecule of water 760 as a byproduct. A covalent bond through nitrogen atom 420 is formed as a result of chemical reaction between amine chemical moiety 220 and epoxide chemical moiety 720—along with another molecule of water 760 as a byproduct. A covalent bond through nitrogen atom 430 is formed as a result of chemical reaction between amine chemical moiety 230 and epoxide chemical moiety 730—along with another molecule of water 760 as a byproduct. A covalent bond through nitrogen atom 440 is formed as a result of chemical reaction between amine chemical moiety 240 and epoxide chemical moiety 740—along with another molecule of water 760. For example, the chemical cross-linking reactions may proceed in accordance with the following general chemical reaction scheme:

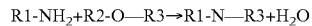

R1-NH$_2$+R2-O—R3→R1-N—R3+H$_2$O

In an illustrative example, R1 is an atom of a first substrate, and R2 and R3 are geminal atoms of a second substrate that are bridged with an epoxide functional group. Attendant to chemical cross-linking, the epoxy group opens to form a covalent bond between R1 and R3 through nitrogen. After the chemical cross-linking reaction opens the cyclic ether ring of the epoxy group, R2 remains disposed on the surface of the second substrate, and generally does not participate in covalent bonding between the first sheet and the second sheet. Although epoxide chemical moieties 710, 720, 730, and 740 are depicted as being disposed within epoxy-containing substrate 300, it will be appreciated that epoxide chemical moieties 710, 720, 730, and 740 can be disposed on or near a surface of epoxy-containing substrate 300—the same representing a surface brought into contact with surface-borne amine moieties of amine-functionalized sheet 200.

In general, the cross-linking reactions occur via nucleophilic attack of an amine nitrogen on a terminal carbon of an epoxy group. The mechanism is generally believed to proceed as an SN2-type II reaction, and thus the reaction rate obeys second-order kinetics. In such a mechanism, the hydrogen atom of the amine group does not directly react with the epoxy group, but rather the nucleophilic nitrogen atom attacks a carbon atom of the epoxy ring, and then the hydrogen atom from the amine subsequently transfers to the epoxy oxygen atom to form —OH. The mechanism suggests that the reactivity depends on the nucleophilicity of the amine—which can vary substantially with electronic and steric effects of near field substituents.

Covalent bonds through nitrogen atoms 410, 420, 430, and 440 generally correspond to at least a portion of covalent bonds through nitrogen atoms forming structure 170, as representatively illustrated in FIG. 1. Reference to this process as a "dehydration reaction" 700, or contextual variants thereof, indicates that water 760 is produced as a byproduct of chemical reaction between amine chemical moieties 135 and epoxide chemical moieties 145, as representatively illustrated in FIG. 1. Additionally, heating 750 may alternatively be termed or otherwise regarded as a curing or co-curing process.

Figure 8:
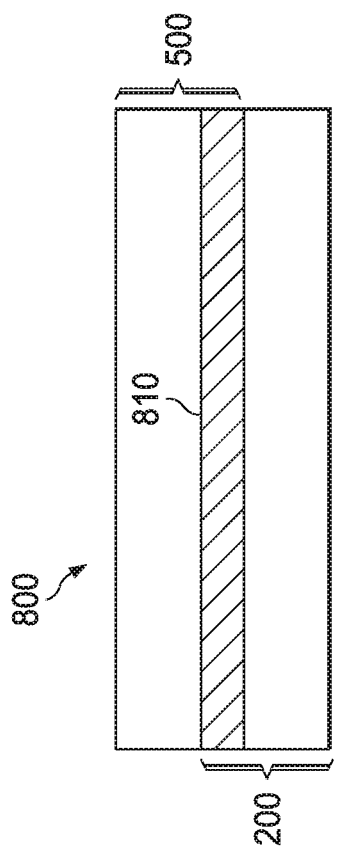
FIG. 8 is an illustration of an inter-penetrated network (IPN) of polymer chains in an interface region between a first thermoplastic substrate and a second thermoplastic substrate in accordance with an illustrative example.

Turning now to FIG. 8, an illustration of an inter-penetrated network (IPN) of polymer chains in an interface region between a first thermoplastic substrate and a second thermoplastic substrate is depicted in accordance with an illustrative example. For example, the first thermoplastic substrate can be amine-functionalized sheet 200, as representatively depicted in FIG. 2, and the second thermoplastic sheet can be second sheet 500, as representatively depicted in FIG. 5. In accordance with an illustrative example, fusion bonding of amine-functionalized sheet 200 and second sheet 500 to form welded structure 800 produces an inter-penetrated network 810 of polymer chains formed from material forming both amine-functionalized sheet 200 and second sheet 500. In a representative aspect, inter-penetrated network 810 of polymer chains extends laterally and is interposed between opposing furthest vertical extents of amine-functionalized sheet 200 and second sheet 500.

An interpenetrating polymer network comprises two or more networks which are at least partially interlaced on a polymer scale, but not covalently bonded to each other. The two or more networks can be considered to be entangled in such a way that they are concatenated and cannot be pulled apart, but not bonded to each other by any chemical bond. Simply mixing two or more polymers, for example as in a polymer blend, does not create an interpenetrating polymer network, nor does creating a polymer network out of more than one kind of monomer, which are bonded to each other to form one network, as in a heteropolymer or a copolymer.

In another illustrative example, first substrate 120 may be exposed to plural plasmas as representatively illustrated, e.g., in FIG. 1 (see dotted-line arrows and ellipses between plasma generator 115 and first substrate 120). That is to say, first substrate 120 can be concurrently or sequentially exposed to different plasmas to form a chemically-functionalized substrate containing more than one type of functional group or chemical moiety. In a representative application, first substrate 120 may be exposed to a first plasma to produce amine-functionalized sheet 200—and thereafter, amine-functionalized sheet 200 may be subsequently exposed to a second plasma to form, e.g., an amine/epoxy-functionalized sheet. In a representative aspect, the second plasma may include or be produce with molecular oxygen, carbon dioxide, or a combination of molecular oxygen and carbon dioxide. Such plural plasma treatment of first substrate 120 can be useful when second substrate 140 contains a hardener (e.g., methylenedianiline, or the like).

In the case of second substrate 140 including methylenedianiline, second substrate 140 will also include amine (—NH$_2$) groups associated with methylenedianiline. Subsequent plasma treatment of amine-functionalized sheet 200 with a second, oxygen-containing plasma forms epoxide groups on amine-functionalized sheet 200 which can then react with amine groups of the methylenedianiline hardener of the second substrate 140 to form additional covalent bonds through nitrogen via dehydration reactions in similar fashion to reactions discussed above with reference to FIG. 7. The extent of amine functionalization and epoxide functionalization produced by plural plasma treatment of the first substrate 120 can be determined as a ratio of epoxy moieties to amine moieties (e.g., corresponding to methylenedianiline concentration) present in the second substrate 140. For example, if the ratio of epoxy:hardener in second substrate 140 is n:1, then the ratio of ammonia plasma treatment to oxygen plasma treatment of the first substrate can be n:1, in order to account for reaction stoichiometry and to optimize subsequent formation of covalent bonds between the first and second substrates.

Figure 9:
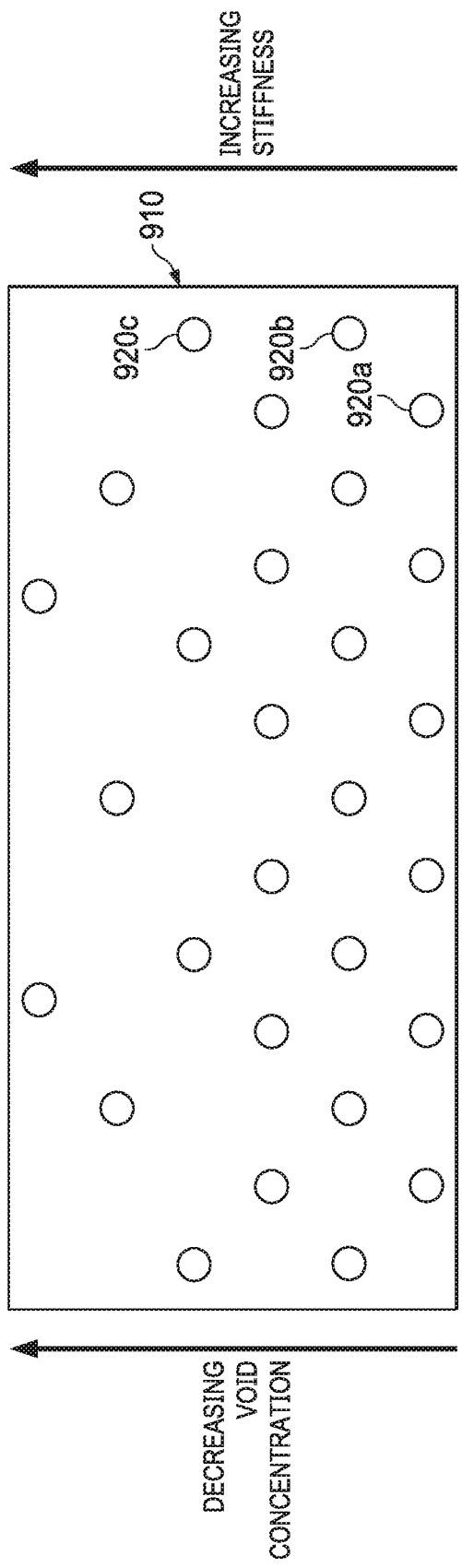
FIG. 9 is an illustration of an elastically graded interlayer employing void regions in accordance with an illustrative example.

Turning now to FIG. 9, an illustration of an elastically graded interlayer employing void regions is depicted in accordance with an illustrative example. As representatively depicted, elastically graded interlayer 910 can correspond to inter-penetrated network 810, as illustrated in FIG. 8. Elastically graded interlayer 910 includes a plurality of void regions—of which, void region 920a, void region 920b, and void region 920c are representative examples. Void regions of the plurality of void regions can be of any size, shape, or other configuration. In a representative aspect, a concentration of void regions decreases moving from a first surface of elastically graded interlayer 910 to an opposing second surface of elastically graded interlayer 910. For example, as representatively illustrated, the concentration of void regions decreases moving from the bottom surface (lower portion as illustrated in FIG. 9) to the top surface (upper portion as illustrated in FIG. 9) of elastically graded interlayer 910. This decrease in void concentration corresponds to an increase in stiffness of elastically graded interlayer 910. That is to say, as the void concentration between a first portion of elastically graded interlayer 910 and a second portion of elastically graded interlayer 910 decreases, the stiffness of elastically graded interlayer 910 between the first portion and the second portion increases. Stated differently, fewer voids disposed within a first region of elastically graded interlayer 910 as compared to a second region of elastically graded interlayer 910 will correspond to material forming the first region being stiffer (less elastic) than material forming the second region. Stated still differently, increasing void concentration corresponds to a decrease in density and elastic modulus.

Difference in the elasticity or stiffness between a thermoplastic layer and thermoset layer can lead to de-bonding due to complex three-dimensional stresses induced at a free edge, even under uniform loading. Accordingly, there should be a gradual change in stiffness through the interlayer. A gradual change in stiffness can be achieved by employing a varying concentration of voids along thickness of the polymer interlayer. Alternatively, fine rubber particles can be used that not only alter stiffness, but also enhance toughness.

Figure 10:
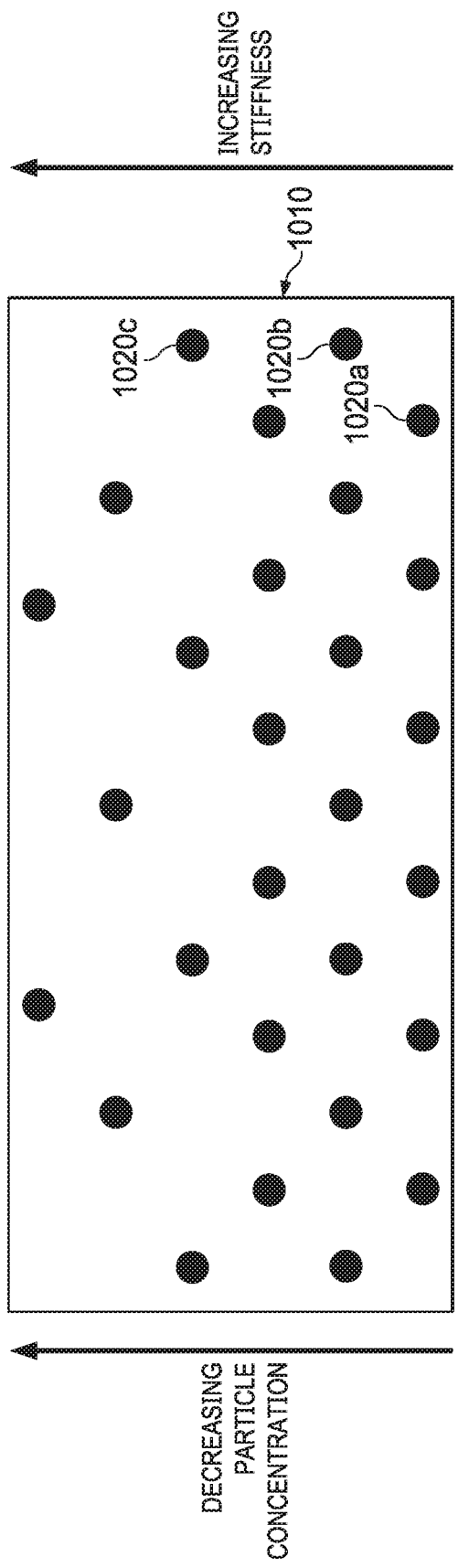
FIG. 10 is an illustration of an elastically graded interlayer employing particles in accordance with an illustrative example.

Turning now to FIG. 10, an illustration of an elastically graded interlayer employing particles is depicted in accordance with an illustrative example. As representatively depicted, elastically graded interlayer 1010 can correspond to inter-penetrated network 810, as illustrated in FIG. 8. Elastically graded interlayer 1010 includes a plurality of particles—of which, particle 1020a, particle 1020b, and particle 1020c are representative examples. Particles of the plurality of particles can be of any type, size, shape, material, or configuration. In a representative aspect, a concentration of particles decreases moving from a first surface of elastically graded interlayer 1010 to an opposing second surface of elastically graded interlayer 1010. For example, as representatively illustrated, the concentration of particles decreases moving from the bottom surface (lower portion as illustrated in FIG. 10) to the top surface (upper portion as illustrated in FIG. 10) of elastically graded interlayer 1010. This decrease in particle concentration corresponds to an increase in stiffness of elastically graded interlayer 1010. That is to say, as the particle concentration between a first portion of elastically graded interlayer 1010 and a second portion of elastically graded interlayer 1010 decreases, the stiffness of elastically graded interlayer 1010 between the first portion and the second portion increases. Stated differently, fewer particles disposed within a first region of elastically graded interlayer 1010 as compared to a second region of elastically graded interlayer 1010 will correspond to material forming the first region being stiffer (less elastic) than material forming the second region. Stated still differently, increasing particle concentration corresponds to a decrease in density and elastic modulus.

A simple linear model for stiffness E as a function of void content $\varphi$ is given as: $E=E_0 (1-\varphi)$, where $E_0$ is the modulus of the bulk polymer—which in the case of PEKK/CF composite is 150 GPa. Thus, to achieve a change in stiffness value of 20 GPa between the TP layer and TS layer, the required void content change would be $20/150=0.15=15\%$. Accordingly, if the thickness of the interlayer is 0.5 mm, the void content must increase by 3% per 0.1 mm along the depth of the interlayer.

In illustrative examples, elastically graded interlayer 910 or elastically graded interlayer 1010 can be configured to provide increased stiffness moving from a thermoset portion to a thermoplastic portion of a combined workpiece or structure to improve adhesion between a thermoset layer and a thermoplastic layer.

Another method of achieving a gradual change in stiffness can be accomplished by joining thin films of decreasing stiffness values. Such films could be of a same material with different content, or different material of desired stiffness values.

Although methods, steps, operations, or procedures are presented in a specific order, this order may be changed in different examples. In some examples, to the extent multiple steps are shown as sequential in the specification, figures, or claims, some combination of such operations in other examples may be performed at a same time or in a different order. The sequence of operations described herein may be interrupted, suspended, or otherwise controlled by another process.

Figure 11:
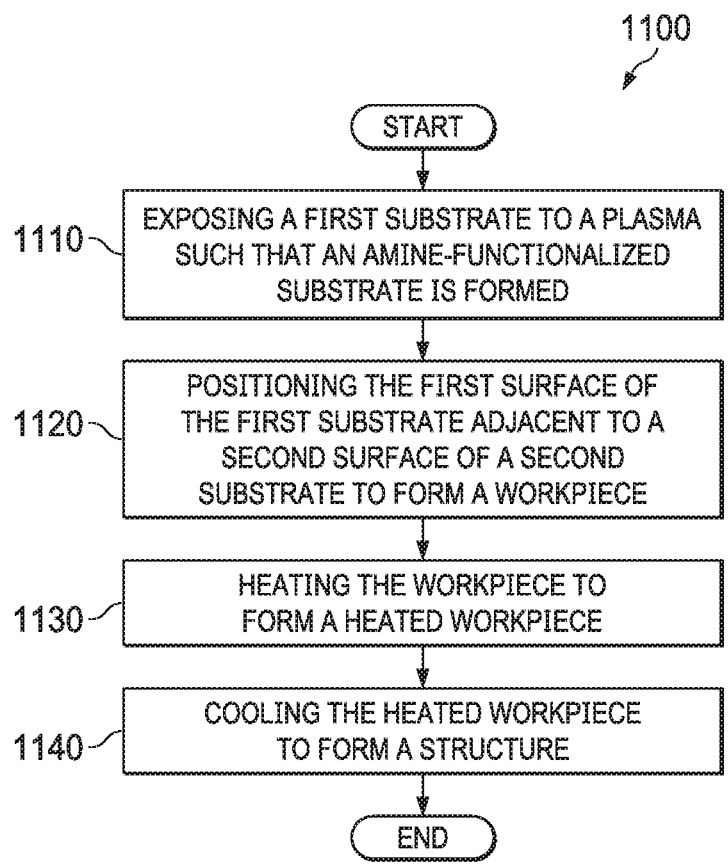
FIG. 11 is an illustration of a flowchart of a process for joining components in accordance with an illustrative example.

Turning now to FIG. 11, an illustration of a flowchart of a process for joining components is depicted in accordance with an illustrative example. The process illustrated in this flowchart can be implemented in manufacturing environment 100 for forming structure 170 in FIG. 1. In some illustrative examples, structure 170 can be a part or workpiece used in the manufacture or service of an aircraft.

Process 1100 exposes a first substrate to a plasma (operation 1110), such that an amine-functionalized substrate is formed, where the amine-functionalized substrate comprises amine chemical moieties. The first substrate can include a polymer material suitably configured for use in a TS/TP composite manufacturing process. For example, the first substrate can include, nylon, flame-retardant nylon, mineral/glass-filled nylon, polystyrene, polyethylene, polymethylmethacrylate (PMMA), thermoplastic elastomers, polyarylether ketones (PAEK), other polymer material, or the like. In a representative aspect, the first substrate comprises a thermoplastic polymer material. In representative implementations, selection of a suitable polymer material can be based on, for example, a desired melting temperature, characteristic of a structure or part so formed, or characteristic relating to stability under conditions for achieving an activation energy associated with forming covalent chemical bonds between substrates.

The plasma can include ammonia, or the plasma can conjunctively or alternatively include molecular nitrogen, molecular hydrogen, or molecular nitrogen and molecular hydrogen. Exposure of the first substrate to the plasma produces an amine-functionalized substrate. The amine-functionalized substrate includes amine chemical moieties on plasma-exposed surfaces of the first substrate. The amine chemical moieties can be $-NH_2$ chemical functional groups. The first substrate can correspond to first substrate 120, and the plasma can correspond to plasma 117 in FIG. 1. The amine-functionalized substrate can be amine-functionalized substrate 130 of FIG. 1, or amine-functionalized sheet 200 in FIG. 2.

Process 1100 positions the amine-functionalized first surface of the first substrate adjacent to a surface of an epoxide-containing second substrate (operation 1120). The combination of the amine-functionalized substrate and the epoxide-containing substrate can correspond to workpiece 150 in FIG. 1.

Process 1100 heats the combined workpiece to form a heated workpiece (operation 1130). Heating causes chemical reactions to occur—forming covalent bonds through nitrogen atoms, and also producing water as a byproduct. Exposure to heat causes chemical dehydration reactions to form covalent bonds between amine chemical moieties of the amine-functionalized substrate and epoxide chemical moieties of the epoxide-functionalized substrate. The heated combination can correspond to heated workpiece 160 in FIG. 1. The covalent bonds can correspond to covalent bonds through nitrogen atoms 410, 420, 430, and 440 in FIG. 4. The amine chemical moieties can correspond to amine chemical moiety 210, amine chemical moiety 220, amine chemical moiety 230, and amine chemical moiety 240 of FIG. 7. The epoxide chemical moieties can correspond to epoxide chemical moiety 710, epoxide chemical moiety 720, epoxide chemical moiety 730, and epoxide chemical moiety 740 of FIG. 7. The heating can correspond to heat 750 (or co-curing) of FIG. 7.

Process 1100 cools the heated workpiece to form a structure (operation 1140). In some examples, cooling can include a process of actively removing thermal energy from a layer of the structure, for example, with convective cooling. In other examples, cooling can include a passive process of allowing a heated layer to passively dissipate heat to the local environment. The structure can correspond to structure 170 in FIG. 1. In some illustrative examples, the structure can be a part used in the manufacture or service of an aircraft.

Figure 12:
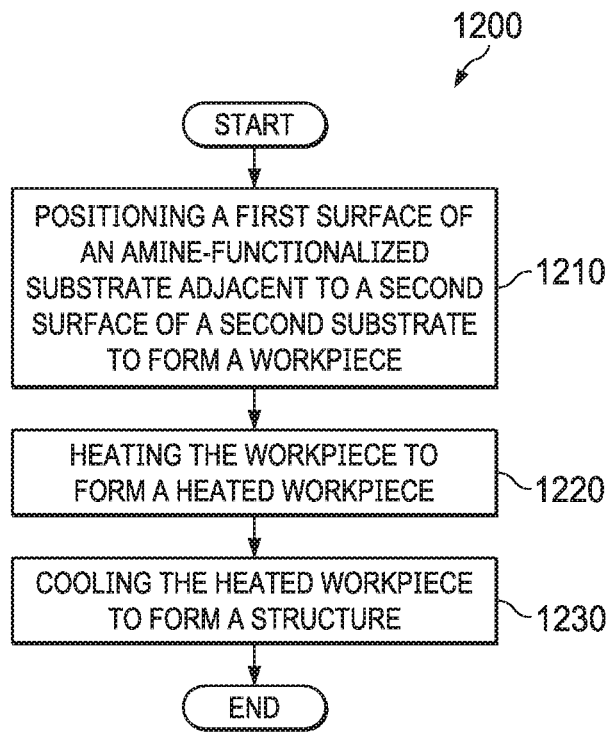
FIG. 12 is an illustration of a flowchart of a process for improving interface strength between joined parts in accordance with an illustrative example.

Turning now to FIG. 12, an illustration of a flowchart of a process for improving interface strength between joined parts is depicted in accordance with an illustrative example. The process illustrated in this flowchart can be implemented in manufacturing environment 100 for forming structure 170 in FIG. 1.

Process 1200 positions a first surface an amine-functionalized substrate adjacent to a second surface of a second substrate to form a workpiece (operation 1210). Second substrate can be an epoxide-functionalized substrate. In this operation, the amine-functionalized substrate is provided as a first substrate treated with a plasma, and the epoxide-functionalized substrate is provided as a second substrate. The amine-functionalized substrate can be amine-functionalized substrate 130 of FIG. 1, or amine-functionalized sheet 200 of FIG. 2. The epoxide-functionalized substrate can be second substrate 140 of FIG. 1, or epoxy-containing substrate 300 in FIG. 3. The workpiece can correspond to workpiece 150 in FIG. 1. The plasma can correspond to plasma 117 in FIG. 1, or the plasma referenced in process 1100 in FIG. 11.

Process 1200 heats the workpiece to form a heated workpiece (operation 1220). In this operation, covalent bonds are formed by dehydration reactions occurring between amine chemical moieties of the amine-functionalized substrate and epoxide chemical moieties of the epoxide-functionalized substrate. The heated workpiece corresponds to heated workpiece 160 in FIG. 1. The covalent bonds can correspond to covalent bonds through nitrogen atoms 410, 420, 430, and 440 in FIG. 4. The amine chemical moieties can correspond to amine chemical moieties 135 in FIG. 1, or amine chemical moiety 210, amine chemical moiety 220, amine chemical moiety 230, and amine chemical moiety 240 in FIG. 2. The epoxide chemical moieties can correspond to epoxide chemical moiety 710, epoxide chemical moiety 720, epoxide chemical moiety 730, and epoxide chemical moiety 740 of FIG. 7.

Process 1200 cools the heated workpiece to form a structure (operation 1230). In some examples, cooling can include a process of actively removing thermal energy from a layer of the structure, for example, with convective cooling. In other examples, cooling can include a passive process of allowing a heated layer to passively dissipate heat to the local environment. The structure can correspond to structure 170 in FIG. 1. In some illustrative examples, the structure can be a part used in the manufacture or service of an aircraft.

In an illustrative example, the amine-functionalized substrate and the epoxide-functionalized substrate are combined to provide a 1:1 stoichiometric ratio of amine chemical functional groups to epoxide chemical functional groups. That is to say, the ratio of amine chemical functional groups to epoxide chemical functional groups can be based on a first number of moles of surface-borne amine groups to a second number of moles of surface-borne epoxide groups. Other ratios of amine-to-epoxide chemical functionalization are also possible. For example, illustrative amine-to-epoxide ratios can be greater than 1:1, or less than 1:1. In representative implementations, a ratio of amine-to-epoxide chemical functionalization can be selected such that a desired amount or density of chemical cross-linking between amine-functionalized substrate surfaces and epoxide-functionalized substrate surfaces is achieved.

Figure 13:
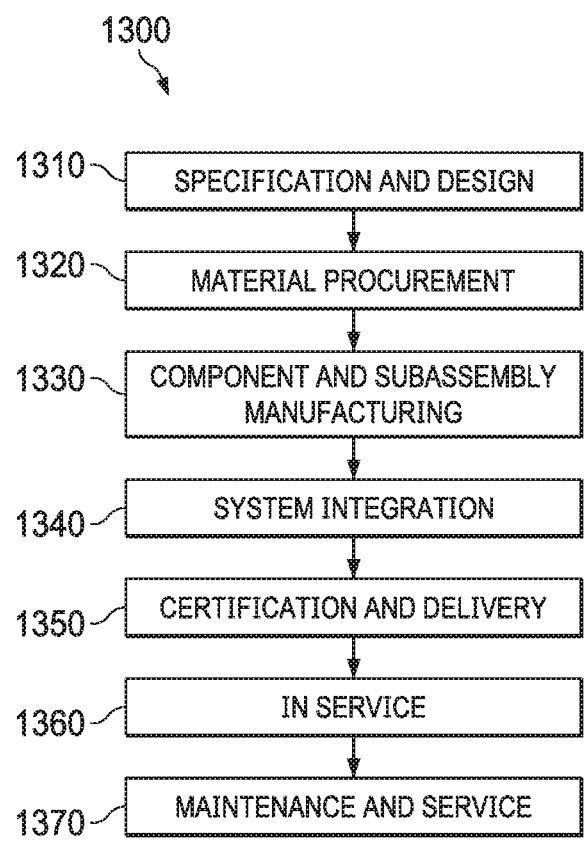
FIG. 13 is an illustration of an aircraft manufacturing and servicing method in accordance with an illustrative example.
Figure 14:
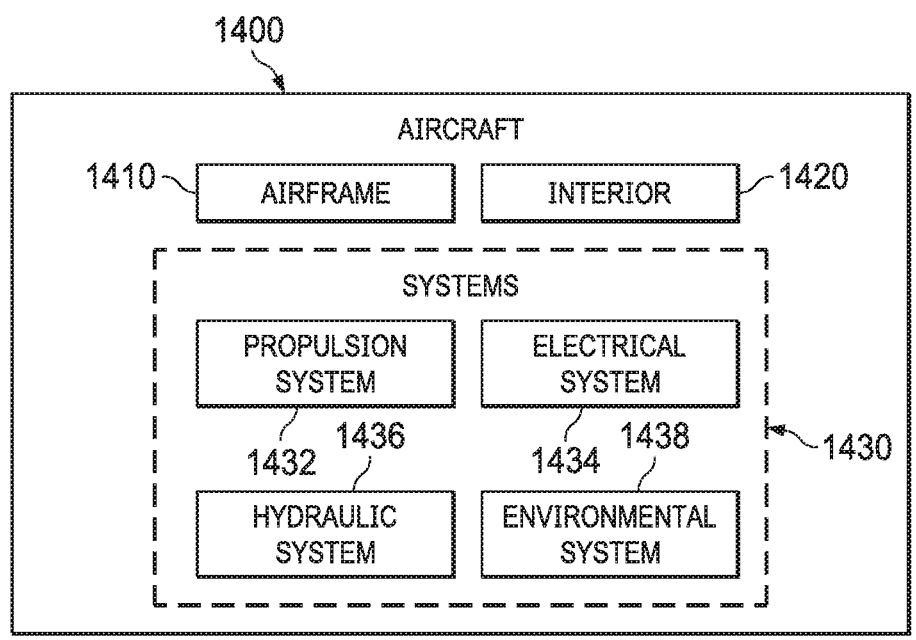
FIG. 14 is an illustration of a block diagram of an aircraft in which an illustrative example can be implemented.

Turning now to FIG. 13, an illustration of an aircraft manufacturing and servicing method is depicted in accordance with an illustrative example. In FIG. 14, an illustration of a block diagram of an aircraft in which an illustrative example can be implemented is depicted. Illustrative examples of the disclosure may be described in the context of aircraft manufacturing and servicing method 1300 as shown in FIG. 13 and aircraft 1400 as shown in FIG. 14. Turning first to FIG. 13, an illustration of an aircraft manufacturing and servicing method is depicted in accordance with an illustrative example. During pre-production, aircraft manufacturing and servicing method 1300 can include specification and design 1310 of aircraft 1400 in FIG. 14 and material procurement 1320.

During production, component and subassembly manufacturing 1330 and system integration 1340 of aircraft 1400 in FIG. 14 takes place. Thereafter, aircraft 1400 in FIG. 14 can go through certification and delivery 1350 in order to be placed in service 1360. While in service 1360 by a customer, aircraft 1400 in FIG. 14 is scheduled for routine maintenance and service 1370, which can include modification, reconfiguration, refurbishment, or other maintenance or service.

Each of the processes of aircraft manufacturing and servicing method 1300 can be performed or carried out by a system integrator, a third party, an operator, or some combination thereof. In these examples, the operator can be a customer. For purposes of this description, a system integrator can include, without limitation, any number of aircraft manufacturers and major-system subcontractors. A third party can include, without limitation, any number of vendors, subcontractors, and suppliers. An operator can be an airline, a leasing company, a military entity, a service organization, or the like.

With reference now to FIG. 14, an illustration of an aircraft 1400 is depicted in which an illustrative example can be implemented. In this example, aircraft 1400 is produced by aircraft manufacturing and servicing method 1300 in FIG. 13, and can include airframe 1410 with plurality of systems 1430 and interior 1420. Examples of systems 1430 include one or more of propulsion system 1432, electrical system 1434, hydraulic system 1436, or environmental system 1438. Any number of other systems can be included. Although an aerospace example is shown, different illustrative examples can be applied to other industries, such as automotive industries, nautical industries, or the like. In the illustrative example, one or more components of aircraft 1400 can be manufactured using structure 170 in FIG. 1. For example, structure 170 can be used to form various components such as a stringer, a skin panel, or other components in airframe 1410. As another example, structure 170 in FIG. 1 can be used to form ducts, ductwork, molding, or other components within interior 1420 of aircraft 1400. These components can have improved strength because of chemical covalent bonds that are present in parts produced using structure 170.

Apparatuses and methods representatively described herein can be employed during at least one stage of aircraft manufacturing and servicing method 1300 in FIG. 13. In an illustrative example, components or subassemblies produced in component and subassembly manufacturing 1330 in FIG. 13 can be fabricated or manufactured in a manner similar to components or subassemblies produced while aircraft 1400 is in service 1360 in FIG. 13. As yet another example, one or more apparatus examples, method examples, or a combination thereof can be utilized during production stages, such as component and subassembly manufacturing 1330 or system integration 1340 in FIG. 13. One or more apparatus examples, method examples, or a combination thereof can be utilized while aircraft 1400 is in service 1360, during maintenance and service 1370 in FIG. 13, or both. The use of a number of the different illustrative examples can substantially expedite assembly of aircraft 1400, reduce the cost of aircraft 1400, or both expedite assembly of aircraft 1400 and reduce the cost of aircraft 1400. For example, expedited assembly of aircraft 1400 can be accomplished with rapid prototyping using TS/TP composite manufacturing techniques that employ apparatuses and methods representatively described herein—as compared to other techniques that would otherwise provide similar part strength. By way of further example, reduced cost of aircraft 1400 can be accomplished using TS/TP composite manufacturing techniques that employ apparatuses and methods representatively described herein—as compared to other techniques that would otherwise involve, for example, fabrication of molds.

Examples or illustrations provided herein are not to be regarded in any way as restrictions on, limits to, or express definitions of any term or terms with which they are associated. Instead, the examples or illustrations are to be regarded as being described with respect to a particular example and as merely illustrative. Those skilled in the art will appreciate that any term or terms with which these examples or illustrations are associated will encompass other examples that may or may not be given therewith or elsewhere in the specification, and all such examples are intended to be included within the scope of that term or those terms. Language designating such non-limiting examples and illustrations includes, but is not limited to: "for example," "for instance," "in an example," "in one example," or the like. Reference throughout this specification to "one example," "an example," "an illustrative example," "a particular example," or "a specific example," or contextually similar terminology, means that a particular feature, structure, property, or characteristic described in connection with the example is included in at least one example and may not necessarily be present in all examples. Thus, respective appearances of the phrases "in an example," "in an illustrative example," or "in a specific example," or similar terminology in various places throughout the specification are not necessarily referring to the same example. Use of the term "example," or contextual variants thereof, in no way indicates admission of prior art. Furthermore, particular features, structures, properties, or characteristics of any specific example may be combined in any suitable manner with one or more other examples. In illustrative examples, uniform hatching, or absence of hatching, illustrated in the figures may correspond to a substantially homogenous material. In other illustrative examples, unitary hatching, or absence of hatching, may represent one or more component material layers.

A general aspect of the present disclosure includes a representative method for joining components. The method includes exposing a first substrate to a plasma such that an amine-functionalized substrate is formed. The amine-functionalized substrate includes amine chemical moieties disposed on a first surface of the first substrate. The method also includes positioning the first surface of the first substrate adjacent to a second surface of a second substrate to form a workpiece. The first surface contacts the second surface. The method also includes heating the workpiece to form a heated workpiece. The method also includes cooling the heated workpiece to form a structure. The plasma can include at least one of ammonia, molecular nitrogen, or molecular nitrogen and molecular hydrogen. The second substrate can include an epoxy material. The first substrate can include a thermoplastic sheet. Heating the workpiece to form the heated workpiece can include heating the workpiece such that covalent bonds are formed between the first surface and the second surface. Heating the workpiece can cause dehydration reactions to occur between epoxide chemical moieties of the epoxy material and the amine chemical moieties of the amine-functionalized substrate. The method can further include positioning a third surface of the structure adjacent to a fourth surface of a third substrate. The third surface of the structure can be a fifth surface of the first substrate, the fifth surface opposing the first surface. The third substrate can include a thermoplastic composite material. The structure can be a first structure. The method can further include welding the third substrate to the first structure to form a second structure. The second structure can include an interpenetrated network of polymer chains interposing the third substrate and the first substrate. The first substrate can have a gradual change in stiffness from the fifth surface to the first surface. The first substrate can include a plurality of void regions having a void concentration that increases from the first surface to the fifth surface. The first substrate can include a plurality of rubber particles having a particle concentration that increases from the first surface to the fifth surface. The method can further include joining a plurality of thin film thermoplastic sheets to each other to form the first substrate. The plurality of thin film thermoplastic sheets can include at least a first sheet and a second sheet. The second sheet can have a different stiffness than the first sheet. The third substrate can include polyether ether ketone (PEEK). The second substrate can include carbon fiber. The third substrate can include carbon fiber. The method can further include exposing the first substrate to a second plasma, such that the first substrate also comprises epoxy chemical moieties disposed on the first surface of the first substrate. The second plasma can include at least one of molecular oxygen or carbon dioxide.

Another general aspect of the present disclosure includes a representative method for improving interface strength between joined parts. The method includes positioning a first surface of an amine-functionalized substrate adjacent to a second surface of a second substrate to form a workpiece. The amine-functionalized substrate is provided as a first substrate treated with a plasma. The method also includes heating the workpiece to form a heated workpiece, and cooling the heated workpiece to form a structure. Plasma treatment of the first substrate can produce amine chemical moieties disposed on the first surface. The plasma can include at least one of ammonia, molecular nitrogen, or molecular nitrogen and molecular hydrogen. The second substrate can include an epoxy material. The first substrate can include a thermoplastic sheet. Heating the workpiece to form the heated workpiece can include heating the workpiece such that covalent bonds are formed between the first surface and the second surface. Heating the workpiece can cause dehydration reactions to occur between epoxide chemical moieties of the epoxy material and the amine chemical moieties of the amine-functionalized substrate. The method can also include positioning a third surface of the structure adjacent to a fourth surface of a third substrate. The third surface of the structure can be a fifth surface of the first substrate, the fifth surface opposing the first surface. The third substrate can include a thermoplastic composite material. The structure can be a first structure. The method can further include welding the third substrate to the first structure to form a second structure. The second structure can include an interpenetrated network of polymer chains interposing the third substrate and the first substrate. The first substrate can have a gradual change in stiffness from the fifth surface to the first surface. The first substrate can include a concentration of void regions that increases from the first surface to the fifth surface. The first substrate can include a concentration of rubber particles that increases from the first surface to the fifth surface. The first substrate can include a plurality of thin film thermoplastic sheets. The plurality of thin film thermoplastic sheets can include at least a first sheet and a second sheet. The first sheet can have a different stiffness than the second sheet. The third substrate can include polyether ether ketone (PEEK). The second substrate can include carbon fiber. The third substrate can include carbon fiber. The method can further include exposing the first substrate to a second plasma, such that the first substrate further comprises epoxy chemical moieties disposed on the first surface. The second plasma can include at least one of molecular oxygen or carbon dioxide.

Yet another general aspect of the present disclosure includes a representative structure that includes a first substrate interposed between a second substrate and a third substrate. The first substrate has a first side and a second side, the second side opposing the first side. The second substrate has a third side. The third side of the second substrate is covalently bonded through a plurality of nitrogen atoms to the first side of the first substrate. The third substrate has a fourth side. The fourth side of the third substrate is connected to the second side of the first substrate. The first substrate can include a first thermoplastic sheet. The second substrate can include an epoxy material. An interpenetrated network of polymer chains can be disposed between the third substrate and the first substrate. The first substrate can have a gradual change in stiffness from the second side to the first side. The first substrate can include at least one of: a concentration of void regions that increases from the first side to the second side; or a concentration of rubber particles that increases from the first side to the second side. The first substrate can include a plurality of thin film thermoplastic sheets. The plurality of thin film thermoplastic sheets can include at least a first sheet and a second sheet, where the first sheet has a different stiffness than the second sheet. The first substrate can include a thermoplastic sheet. The second substrate can include epoxy and carbon fiber. The third substrate can include polyether ether ketone (PEEK) and carbon fiber.

One or more technical solutions are presented that overcome technical problems associated with providing strong attachment between TS component parts and TP component parts. As a result, one or more technical solutions described herein provide technical effects of enabling formation of chemical bonds between constituent materials used in TS/TP composite manufacturing processes, enabling fabrication of TS/TP composite manufactured parts that are at least as strong as parts fabricated with other techniques, enabling increased utilization of TS/TP composite manufacturing for making strong parts, supporting part qualification with respect to manufacturing specifications or mechanical property requirements, or realizing cost savings associated with using TS/TP composite manufacturing to make parts that are at least as strong as parts fabricated with other processes.

Descriptions of different illustrative examples have been presented for purposes of illustration and description, and are not intended to be exhaustive or limited to the examples in the form disclosed. The different illustrative examples describe components that perform actions or operations. In an illustrative example, a component can be configured to perform action or operation described. For example, a component can have a configuration or design for a structure that provides the component an ability to perform the action or operation that is described in the illustrative examples as being performed by the component.

Many modifications and variations will be apparent to those of ordinary skill in the art. Furthermore, different illustrative examples may provide different features as compared to other examples. The examples or examples selected are chosen and described in order to explain principles of the examples, practical application, and to enable others of ordinary skill in the art to understand the disclosure for various examples with various modifications as are suited to one or more particular contemplated uses.

What is claimed is:

1. A method for joining components, the method comprising:
    providing a first substrate;
    exposing the first substrate to a plasma such that an amine-functionalized substrate is formed, wherein the amine-functionalized substrate comprises amine chemical moieties disposed on a first surface of the first substrate;
    positioning the first surface of the first substrate adjacent to a second surface of a second substrate to form a workpiece such that the first surface contacts the second surface;
    heating the workpiece to form a heated workpiece;
    cooling the heated workpiece to form a structure; and
    positioning a third surface of the structure adjacent to a fourth surface of a third substrate, the third surface of the structure being a fifth surface of the first substrate, the fifth surface opposing the first surface,
    wherein the second surface of the second substrate is directly covalently bonded through a plurality of nitrogen atoms to the first surface of the first substrate, and
    wherein the first substrate includes a plurality of rubber particles having a particle concentration that increases from the first surface to the fifth surface.

2. The method of claim 1, wherein:
    the plasma comprises at least one of:
        ammonia;
        molecular nitrogen; or
        molecular nitrogen and molecular hydrogen.

3. The method of claim 1, further comprising:
    exposing the first substrate to a second plasma, such that the first substrate comprises epoxy chemical moieties disposed on the first surface of the first substrate.

4. The method of claim 3, wherein:
    the second plasma comprises at least one of:
        molecular oxygen; or
        carbon dioxide.

5. The method of claim 1, wherein:
    the second substrate comprises an epoxy material;
    the first substrate comprises a thermoplastic sheet; and
    heating the workpiece to form the heated workpiece comprises at least one of:
        heating the workpiece to form the heated workpiece comprises heating the workpiece such that covalent bonds are formed between the first surface and the second surface; or
        heating the workpiece causes dehydration reactions to occur between epoxide chemical moieties of the epoxy material and the amine chemical moieties of the amine-functionalized substrate,
        wherein the second surface of the second substrate is directly covalently bonded through the plurality of nitrogen atoms and a plurality of carbon atoms to the first surface of the first substrate.

6. The method of claim 1, wherein:
    the third substrate comprises a thermoplastic composite material;
    the structure is a first structure and further comprising:
        welding the third substrate to the first structure to form a second structure; and
    the second structure comprises an interpenetrated network of polymer chains interposing the third substrate and the first substrate.

7. The method of claim 1, wherein
    the first substrate includes a plurality of void regions having a void concentration that increases from the first surface to the fifth surface.

8. The method of claim 7, further comprising:
    joining a plurality of film thermoplastic sheets to each other to form the first substrate, wherein:

the plurality of film thermoplastic sheets comprises at least a first sheet and a second sheet; and the second sheet has a different stiffness than the first sheet.

9. The method of claim 7, wherein at least one of:

the third substrate comprises polyether ether ketone (PEEK);

the third substrate comprises carbon fiber; or the second substrate comprises carbon fiber.

10. A method for improving interface strength between joined parts, the method comprising:

providing an amine-functionalized substrate;

positioning a first surface of the amine-functionalized substrate adjacent to a second surface of a second substrate to form a workpiece, wherein the amine-functionalized substrate is provided as a first substrate treated with a plasma;

heating the workpiece to form a heated workpiece;

cooling the heated workpiece to form a structure; and positioning a third surface of the structure adjacent to a fourth surface of a third substrate, the third surface of the structure being a fifth surface of the first substrate, the fifth surface opposing the first surface, wherein the second surface of the second substrate is directly covalently bonded through a plurality of nitrogen atoms to the first surface of the first substrate, and wherein the first substrate includes a plurality of rubber particles having a particle concentration that increases from the fifth surface to the first surface.

11. The method of claim 10, wherein:

plasma treatment of the first substrate produces amine chemical moieties disposed on the first surface; and the plasma comprises at least one of:
  ammonia;
  molecular nitrogen; or
  molecular nitrogen and molecular hydrogen.

12. The method of claim 11, further comprising:

exposing the first substrate to a second plasma, such that the first substrate comprises epoxy chemical moieties disposed on the first surface, wherein:
  the second plasma comprises at least one of:
    molecular oxygen; or
    carbon dioxide.

13. The method of claim 12, wherein:

the second substrate comprises an epoxy material;

the first substrate comprises a thermoplastic sheet; and heating the workpiece to form the heated workpiece comprises at least one of:
  heating the workpiece such that covalent bonds are formed between the first surface and the second surface; or
  heating the workpiece causes dehydration reactions to occur between epoxide chemical moieties of the epoxy material and the amine chemical moieties of the amine-functionalized substrate, wherein the second surface of the second substrate is directly covalently bonded through the plurality of nitrogen atoms and a plurality of carbon atoms to the first surface of the first substrate.

14. The method of claim 13, wherein:

the third substrate comprises a thermoplastic composite material; and the structure is a first structure; and welding the third substrate to the first structure to form a second structure, wherein the second structure comprises an interpenetrated network of polymer chains interposing the third substrate and the first substrate.

15. The method of claim 14, wherein the first substrate comprises a concentration of void regions that increases from the first surface to the fifth surface.

16. The method of claim 15, wherein:

the first substrate comprises a plurality of film thermoplastic sheets;

the plurality of film thermoplastic sheets comprises at least a first sheet and a second sheet; and the first sheet has a different stiffness than the second sheet.

17. The method of claim 15, wherein:

the third substrate comprises at least one of polyether ether ketone (PEEK) or carbon fiber; and the second substrate comprises carbon fiber.

18. A method for joining components, the method comprising:

providing a first substrate;

exposing the first substrate to a plasma such that an amine-functionalized substrate is formed, wherein the amine-functionalized substrate comprises amine chemical moieties disposed on a first surface of the first substrate;

positioning the first surface of the first substrate adjacent to a second surface of a second substrate comprising an epoxy material to form a workpiece such that the first surface contacts the second surface;

heating the workpiece to form a heated workpiece;

cooling the heated workpiece to form a structure; and positioning a third surface of the structure adjacent to a fourth surface of a third substrate, the third surface of the structure being a fifth surface of the first substrate, the fifth surface opposing the first surface, wherein the second surface of the second substrate is directly covalently bonded through a plurality of nitrogen atoms and a plurality of carbon atoms to the first surface of the first substrate, and wherein the first substrate includes a plurality of rubber particles having a particle concentration that increases from the fifth surface to the first surface.

19. The method of claim 18, wherein the first substrate comprises a concentration of void regions that increases from the first surface to the fifth surface.

20. The method of claim 19, wherein:

the first substrate comprises a plurality of film thermoplastic sheets;

the plurality of film thermoplastic sheets comprises at least a first sheet and a second sheet; and the first sheet has a different stiffness than the second sheet.

21. The method of claim 19, wherein:

the third substrate comprises at least one of polyether ether ketone (PEEK) or carbon fiber; and the second substrate comprises carbon fiber.

* * * * *